United States Patent
Zhang et al.

(10) Patent No.: US 10,118,232 B2
(45) Date of Patent: Nov. 6, 2018

(54) HIGH-SPEED PRECISION INTERRUPTED ULTRASONIC VIBRATION CUTTING METHOD

(71) Applicant: BEIHANG UNIVERSITY, Beijing (CN)

(72) Inventors: Deyuan Zhang, Beijing (CN); Xiangyu Zhang, Beijing (CN); He Sui, Beijing (CN); Wenlong Xin, Beijing (CN); Xinggang Jiang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 121 days.

(21) Appl. No.: 15/297,095

(22) Filed: Oct. 18, 2016

(65) Prior Publication Data

US 2017/0100781 A1 Apr. 13, 2017

(30) Foreign Application Priority Data

Jun. 21, 2016 (CN) .......................... 2016 1 0453083

(51) Int. Cl.
| | |
|---|---|
| *B24B 49/10* | (2006.01) |
| *B23B 37/00* | (2006.01) |
| *B23B 29/12* | (2006.01) |
| *B23C 9/00* | (2006.01) |
| *B24B 1/04* | (2006.01) |

(Continued)

(52) U.S. Cl.
CPC .......... *B23B 37/00* (2013.01); *B23B 29/125* (2013.01); *B23C 3/00* (2013.01); *B23C 9/005* (2013.01); *B23D 75/00* (2013.01); *B24B 1/04* (2013.01); *B23B 2215/04* (2013.01); *B23B 2220/36* (2013.01); *B23B 2265/16* (2013.01); *B23C 2215/04* (2013.01); *B23C 2220/44* (2013.01);

(Continued)

(58) Field of Classification Search
CPC ........... B24B 49/10; B24B 1/04; B23B 37/00; B23B 1/00
USPC ................................ 451/5, 11, 130, 165, 28
See application file for complete search history.

(56) References Cited

U.S. PATENT DOCUMENTS

2014/0216216 A1* 8/2014 Hessenkamper ..... B23B 29/125
82/1.11

FOREIGN PATENT DOCUMENTS

| CN | 101376179 | 3/2009 |
| CN | 101633048 | 1/2010 |

(Continued)

*Primary Examiner* — Robert Rose

(57) ABSTRACT

A high-speed precision interrupted ultrasonic vibration cutting method includes steps of: (1) installing an ultrasonic vibration apparatus on a machine tool, and stimulating a cutting tool to generate a transverse vibration, so as to realize varieties of machining processes; (2) realizing an interrupted cutting process by setting cutting parameters and vibration parameters to satisfy an interrupted cutting conditions; and (3) turning on the ultrasonic vibration apparatus and the machine tool, and starting a high-speed precision interrupted ultrasonic vibration cutting process. High-speed precision interrupted ultrasonic vibration cutting is able to be realized through the above steps during machining of difficult-to-machine materials in aviation and aerospace fields. A cutting speed is enhanced significantly, and exceeds a critical cutting speed of a conventional ultrasonic vibration cutting method and an elliptical ultrasonic vibration cutting method and even a high speed range of a traditional cutting method.

8 Claims, 11 Drawing Sheets

(51) Int. Cl.
*B23C 3/00* (2006.01)
*B23D 75/00* (2006.01)

(52) U.S. Cl.
CPC ...... *B23C 2265/16* (2013.01); *B23C 2270/10* (2013.01)

(56) References Cited

FOREIGN PATENT DOCUMENTS

| CN | 101804575 | 8/2010 |
| CN | 102049531 | 5/2011 |
| CN | 102717115 | 10/2012 |

* cited by examiner

HIGH-SPEED PRECISION INTERRUPTED ULTRASONIC VIBRATION CUTTING METHOD

CROSS REFERENCE OF RELATED APPLICATION

The application claims priority under 35 U.S.C. 119(a-d) to CN 201610453083.9, filed Jun. 21, 2016.

BACKGROUND OF THE PRESENT INVENTION

Field of Invention

The present invention relates to a high-speed precision interrupted ultrasonic vibration cutting method. By imparting ultrasonic vibration to a cutting tool through interrupted ultrasonic cutting during a whole cutting process, with reasonable set cutting parameters and vibration parameters, a workpiece is accomplished. An ultrasonic separation effect, which occurs during the cutting process, is able to realize precision machining in a high cutting speed.

Description of Related Arts

A high-speed cutting technology is an advanced machining technology having higher efficiency. Compared to a traditional cutting technology, the high-speed cutting technology obtains a much higher cutting speed. Non-ferrous metal, cast iron, steel, fiber reinforced composite material and nearly all kinds of difficult-to-machine materials are able to be machined. The high speed range differs for different materials. Steel, cast iron, nickel base alloys, titanium alloys, aluminum alloys, bronze and brass, and fiber-reinforced plastics are tested by Institut für Produktionsmanagement, Technologie und Werkzeugmaschinen (PTW) of Darmstadt University of Technology, Germany, in 1980s, and cutting speed ranges thereof are showed in FIG. 1.

Ultrasonic vibration cutting is a typical interrupted cutting method and is gradually developed into an advanced high precision machining method after being proposed. The conventional ultrasonic vibration cutting method (referring to FIG. 2A) has the vibration direction in parallel with the cutting speed direction and thus is known as the longitudinal ultrasonic vibration cutting method. The conventional ultrasonic vibration cutting method has advantages of reducing the cutting force and the cutting temperature, and improving the cutting ability and the machining quality. However, during the cutting process, the tool tip keeps engaged in the finished surface even though a separation effect between the tool tip and the chip exists, which enhances the friction between the cutting edge and the finished surface and causes tool breaking. The elliptical ultrasonic vibration cutting method is proposed in the 1990s, which realizes the complete separation of the tool and the workpiece because of the periodical elliptical vibration of the cutting tool. Besides, the cutting force and the machining error are further reduced compared to the conventional ultrasonic vibration cutting method, and the tool life is prolonged by more than ten times. However, a critical cutting speed $v=2\pi FA$ (F is the tool vibration frequency, and A is the tool vibration amplitude) exists in both of the conventional ultrasonic vibration cutting method and the elliptical ultrasonic vibration cutting method. Therefore, the above significant advantages are realized at an extremely low cutting speed (generally 4-6 m/min). Once the cutting speed approaches to or exceeds the critical cutting speed, the advantages are all vanished. In conclusion, the application of ultrasonic vibration cutting is largely limited.

SUMMARY OF THE PRESENT INVENTION (1) Objects of the Present Invention

An object of the present invention is to provide a high-speed precision interrupted ultrasonic vibration cutting method (referring to FIG. 3) under a transverse vibration or a vibration with a transverse component, by which a critical cutting speed is exceeded with cutting force and cutting temperature reductions and a machining quality improvement in a field of vibration cutting, and even a high speed range of a traditional cutting method is exceeded with the same machining accuracy and efficiency as the traditional cutting method. The method is able to significantly enhance the machining efficiency when a tool consumption and a machining quality keep the same, and therefore, the method is able to be applied to varieties of machining processes, such as turning, milling, drilling, and grinding.

(2) Technical Solutions of the Present Invention

The present invention provides a high-speed precision interrupted ultrasonic vibration cutting method, comprising steps of:

(1) installing an ultrasonic vibration apparatus on a machine tool, and stimulating a cutting tool to generate a transverse vibration or a vibration with a transverse component, wherein: through combining different vibration types and machining process types, varieties of machining processes are able to be realized;

(2) realizing an interrupted cutting process by setting cutting parameters and vibration parameters to satisfy interrupted cutting conditions and periodically separating the cutting tool from a finished surface profile of a workpiece; and (3) turning on the ultrasonic vibration apparatus and the machine tool, and starting a high-speed precision interrupted ultrasonic vibration cutting process.

The ultrasonic vibration apparatus in the step (1) is an apparatus which is able to stimulate the cutting tool to generate a transverse steady ultrasonic vibration or a steady ultrasonic vibration with a transverse component by amplifying a vibration generated by a transducer stimulated by an ultrasonic generator through a horn.

The machine tool in the step (1) comprises lathes, milling machines, drilling machines, grinding machines, and machine centers.

The cutting tool in the step (1) comprises turning tools, milling tools, grinding tools, drilling tools, reamers and countersinks.

The transverse vibration or the vibration with the transverse component in the step (1) is an ultrasonic vibration on any point of the cutting tool, wherein a vibration direction thereof is vertical to a cutting speed direction.

When the varieties of machining processes in the step (1) is a combination of the varieties of vibration types and a turning process, the varieties of machining processes comprise three types, respectively high-speed interrupted axial direction ultrasonic vibration turning, high-speed interrupted radical direction ultrasonic vibration turning, and high-speed interrupted elliptical ultrasonic vibration turning. When the varieties of machining processes is a combination of the varieties of vibration types and a milling process, the varieties of machining processes comprise two types, respectively high-speed interrupted two-dimensional (2D) elliptical ultrasonic vibration milling and high-speed interrupted axial direction ultrasonic vibration plunge milling.

When the varieties of machining processes is a combination of the varieties of vibration types and a grinding process, the varieties of machining processes comprise two types, respectively high-speed interrupted 2D elliptical ultrasonic vibration grinding and high-speed interrupted axial direction ultrasonic vibration grinding. When the varieties of machining processes is a combination of the varieties of vibration types and a drilling process, the varieties of machining processes comprise two types, respectively high-speed interrupted 2D elliptical ultrasonic vibration drilling and high-speed interrupted axial direction ultrasonic vibration drilling. When the varieties of machining processes is a combination of the varieties of vibration types and a reaming process, the varieties of machining processes comprise two types, respectively high-speed interrupted 2D elliptical ultrasonic vibration reaming and high-speed interrupted axial direction ultrasonic vibration reaming. When the varieties of machining processes is a combination of the varieties of vibration types and a counter boring process, the varieties of machining processes comprise two types, respectively high-speed interrupted 2D elliptical ultrasonic vibration counter boring and high-speed interrupted axial direction ultrasonic vibration counter boring.

The cutting parameters in the step (2) comprise a depth of cut, a feedrate and a cutting speed.

The vibration parameters in the step (2) comprise a vibration amplitude and a vibration frequency.

The interrupted cutting condition in the step (2) refers to a formula as listed (referring to FIG. 3A) of:

$$\begin{cases} \Delta \leq 2A \\ 2\arcsin(\Delta/2A) \leq \phi \leq 2\pi - 2\arcsin(\Delta/2A) \end{cases},$$

wherein: $\Delta$ is a center line offset value of two adjacent feed tool paths, which is related to the cutting parameters of feedrate, depth of cut and so on, and determined according to a specific machining process; $\phi$ is a phase difference of the two adjacent feed tool paths, which is related to the vibration parameters of tool vibration frequency and workpiece or tool rotatory speed, and determined according to the specific machining process and the vibration types; and A is a tool vibration amplitude.

The step of "setting cutting parameters and vibration parameters" in the step (2) has principles that: a relative small $\Delta$ and a 180 degree phase difference are optimal for an interrupted separation of best effection; $\Delta$ is a parameter to scale a transverse relation of the two adjacent feed tool paths while $\phi$ is a parameter to scale a longitudinal relation of the two adjacent feed tool paths, and, $\Delta$ and $\phi$ affect an interrupted separation effect simultaneously; when a value of $\Delta$ exceeds double of a value of the vibration amplitude, due to an oversized transverse distance between the two adjacent feed tool paths, whatever a value of $\phi$, no interrupted separation effect occurs during the whole cutting process; conversely, when the value of $\phi$ is given in an appropriate neighborhood of zero, because no cross point exists at the two adjacent feed tool paths, whatever the value of $\Delta$, no interrupted separation effect occurs during the whole cutting process.

The finished surface profile in the step (2) is a combination curve of six arcs (referring to FIG. 3A), respectively an arc $M_1M_2$, an arc $M_2/M_3$, an arc $M_3M_4$, an arc $M_4M_5$, an arc $M_5M_6$ and an arc $M_6M_7$, which are respectively an $(N-1)^{th}$ tool motion path, an $(N-2)^{th}$ tool motion path (not shown in FIG. 3A and the same below), an $(N-3)^{th}$ tool motion path, an $(N-4)^{th}$ tool motion path, an $(N-5)^{th}$ tool motion path, and an $(N-6)^{th}$ tool motion path. The number of the tool motion paths influencing the finished surface profile is determined by the tool vibration amplitude A and the center line offset value $\Delta$ of the two adjacent feed tool paths. When a value of $2A/\Delta$ is an integer, the number equals to $2A/\Delta$, while when the value of $2A/\Delta$ is a decimal, the number equals to an integer part of $2/\Delta$ plus one. A high-speed interrupted ultrasonic vibration cutting surface profile is showed in FIG. 3B; as a tool nose round radius is far greater than the value of $\Delta$, a regular surface profile is obtained after repeatedly cutting by a tool tip and thus a better surface quality is obtained.

Referring to FIG. 3A, the interrupted cutting process in the step (2) is an interrupted cutting process of the cutting tool with the transverse vibration or the vibration with the transverse component along an $N^{th}$ tool motion path, which has the interrupted separation effect on the finished surface profile of the workpiece. A point "a" is where the cutting tool is just engaged into the finished surface profile of the workpiece during a vibration cutting cycle. A point "b" is located at a lowest point of the $N^{th}$ tool motion path. A stage from the point "a" to the point "b" is a cut-in stage, during which the tool and the workpiece are in contact sufficiently, the depth of cut increases, a cutting force is enhanced and a cutting heat is accumulated. A point "c" is where the cutting tool is just disengaged form the finished surface profile of the workpiece during a vibration cycle. A stage from the point "b" to the point "c" is a cut-out stage, during which a contact area of the tool and the workpiece decreases, a cutting zone gradually separates from the workpiece, the cutting force decreases and a cutting heat accumulation slows down. At the point "c", the cutting tool is completely separated from the finished surface profile of the workpiece, the cutting zone vanishes, the cutting force decreases to zero, and the cutting heat starts to transmit to surrounding mediums. A point "d" is where the cutting tool is just engaged into the finished surface profile in a next vibration cycle. A stage from the point "c" to the point "d" is a noncutting stage. During the noncutting stage, the cutting tool is completely separated from the workpiece; the cutting force stays at zero; if a cooling medium such as cutting fluid exists, the cutting zone of the cutting tool fully contacts the cooling medium such as the cutting fluid; and a temperature of the cutting tool decreases significantly. A process of (point "a")-to-(point "b")-to-(point "c")-to-(point "d") is a cutting process during one vibration cycle when the transverse vibration or the vibration with the transverse component is applied, which occurs periodically as the vibration is repeated periodically during the whole machining process.

High-speed interrupted ultrasonic vibration cutting is able to be realized through the above steps during machining of difficult-to-machine materials in aviation and aerospace fields. The cutting speed is enhanced significantly, which exceeds the critical cutting speed of a conventional ultrasonic vibration cutting method and an elliptical ultrasonic vibration cutting method and even the high speed range of the traditional cutting method. Besides, beneficial effects of cutting force and cutting temperature reductions, tool life prolonging, machining cost save, and surface quality and machining accuracy improvements are all obtained at the same time.

(3) Beneficial Effects

The beneficial effects of the high-speed precision interrupted ultrasonic vibration cutting method provided by the present invention are described as follows.

① The critical cutting speed of the conventional ultrasonic vibration cutting method and the elliptical ultrasonic vibration cutting method is exceeded. Significant advantages of the conventional ultrasonic vibration cutting method and the elliptical ultrasonic vibration cutting method are realized at an extremely low cutting speed. However, the advantages of vibration cutting are still able to be obtained through a tool-workpiece periodical separation effect by an application of the transverse vibration or the vibration with the transverse component.

② The high speed range of the traditional cutting method is exceeded. During a traditional high-speed cutting process, the cutting heat accumulates severely due to a relative longer continuous contact time of the tool and the workpiece. Thus, the tool is worn rapidly and fails. In order to ensure an available tool life, a traditional cutting speed is generally in a low speed range of a corresponding material and machining process, leading that a machining efficiency is limited largely. However, a tool cutting heat accumulation is able to be avoided through the tool-workpiece periodical separation effect by the application of the transverse vibration or the vibration with the transverse component in the high-speed precision interrupted ultrasonic vibration cutting method. The cutting speed is able to reach two or three times of the traditional cutting speed, with a same tool life or surface quality, which enters the high speed range of the corresponding material and machining process and accordingly greatly enhances a cutting efficiency.

③ Referring to FIG. 4, the high-speed precision interrupted ultrasonic vibration cutting method is able to reduce the cutting force, wherein: compared to the traditional cutting method, a maximum reduction of a thrust cutting force is able to reach 50%.

④ Compared to the traditional cutting method, the cutting temperature of the high-speed precision interrupted ultrasonic vibration cutting method is reduced significantly. When the cutting fluid is applied, because of the interrupted separation effect, the cutting tool is fully cooled and lubricated in the noncutting stage, and a temperature reduction effect is more obvious.

⑤ Referring to FIG. 5, the high-speed precision interrupted ultrasonic vibration cutting method is able to defer a tool wear, and prolong the tool life. Compared to the traditional cutting method, in an experiment of turning titanium alloys with a linear cutting speed of 200 m/min a depth of cut of 0.05 mm a feedrate of 0.005 mm/r and a regular cutting fluid, the high-speed precision interrupted ultrasonic vibration cutting method is able to defer a tool wear speed significantly. When a wear criterion is defined as VB=0.3 and Ra=0.4, the tool life increases by three times.

⑥ Referring to FIG. 6, the high-speed precision interrupted ultrasonic vibration cutting method is able to enhance a cutting length. When the wear criterion for high precision cutting is defined as Ra=0.4, compared to the traditional cutting method, the cutting speed (efficiency) is doubled under a same cutting length condition while the cutting length is able to increase by three times under a same cutting speed condition.

⑦ The high-speed precision interrupted ultrasonic vibration cutting method is able to be applied to the varieties of machining processes, such as turning, milling, drilling, and grinding, which realizes high-speed precision machining of complex parts or the difficult-to-machine materials.

| | | |
|---|---|---|
| 1: workpiece | 2: cutting tool | 21: turning tool |
| 22: milling tool | 23: grinding tool | 24: drilling tool |
| 25: reamer | 26: countersink | |

DETAILED DESCRIPTION OF THE PREFERRED EMBODIMENT

Figure 1:
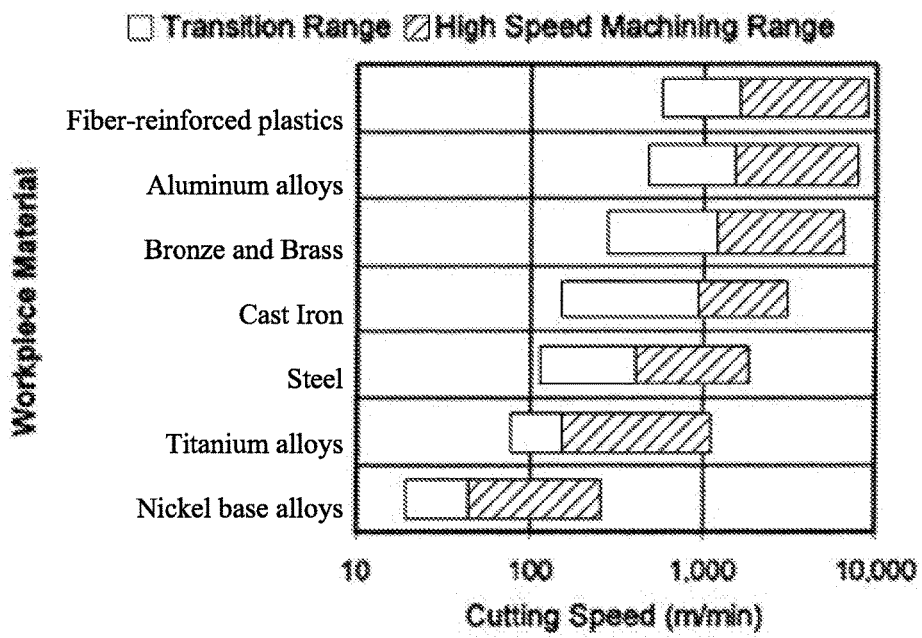
FIG. 1 is a schematic diagram of a speed range of high-speed machining according to prior art.
Figure 2A:
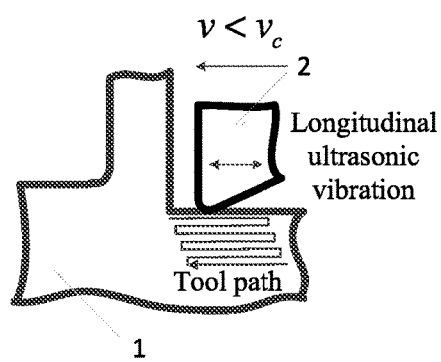
FIG. 2A is a schematic diagram of a conventional ultrasonic vibration cutting method according to the prior art.
Figure 2B:
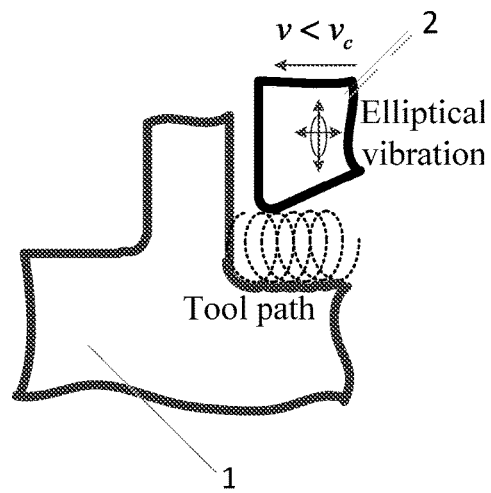
FIG. 2B is a schematic diagram of an elliptical ultrasonic vibration cutting method according to the prior art.
Figure 3:
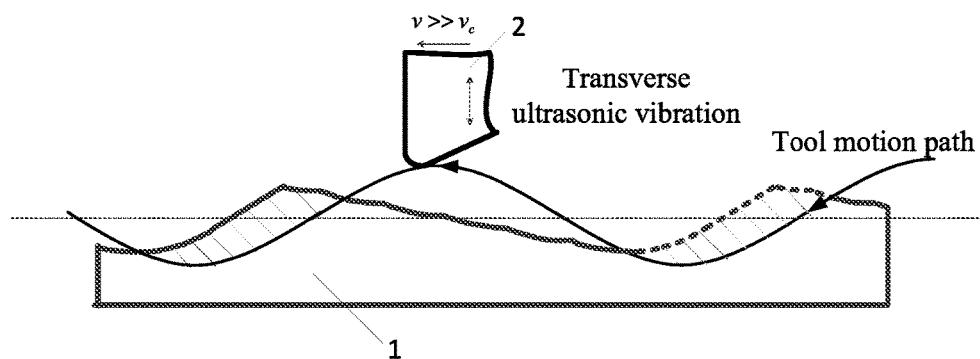
FIG. 3 is a schematic diagram of a high-speed precision interrupted ultrasonic vibration cutting method according to preferred embodiments of the present invention.
Figure 3A:
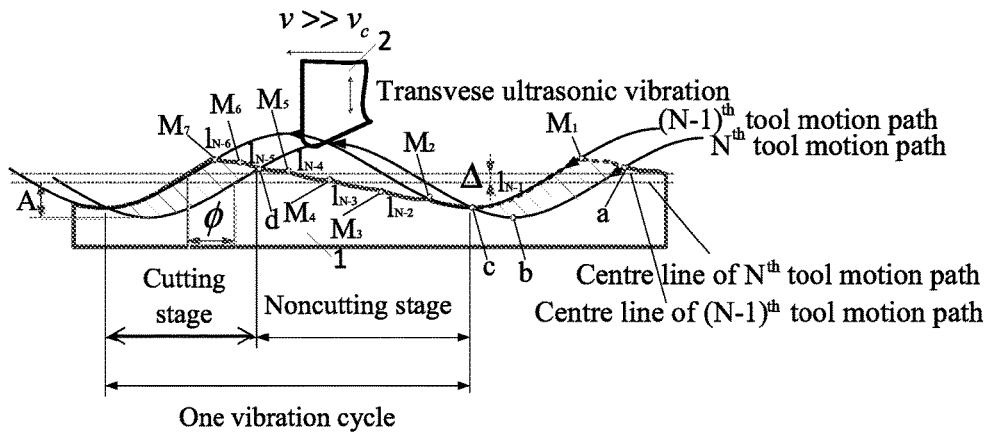
FIG. 3A is a principal diagram of the high-speed precision interrupted ultrasonic vibration cutting method according to the preferred embodiments of the present invention.
Figure 3B:
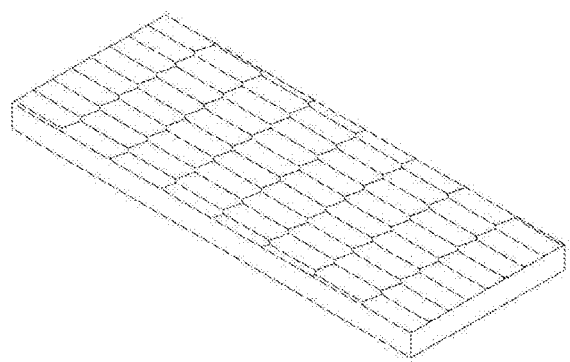
FIG. 3B shows a cutting surface profile of the high-speed precision interrupted ultrasonic vibration cutting method according to the preferred embodiments of the present invention.
Figure 4:
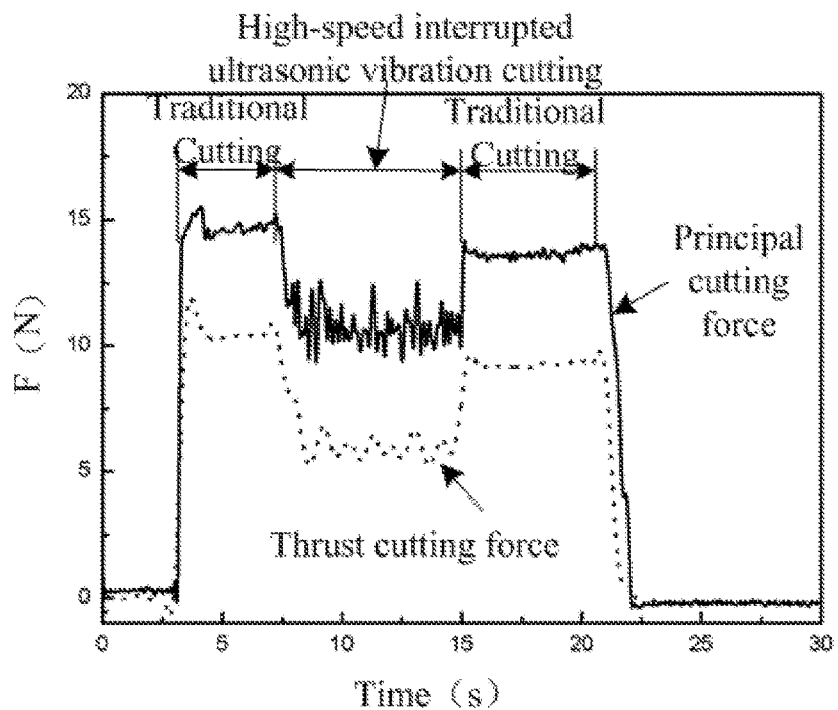
FIG. 4 is a comparison diagram of a cutting force of the high-speed precision interrupted ultrasonic vibration cutting method and a traditional cutting method according to the preferred embodiments of the present invention.
Figure 5:
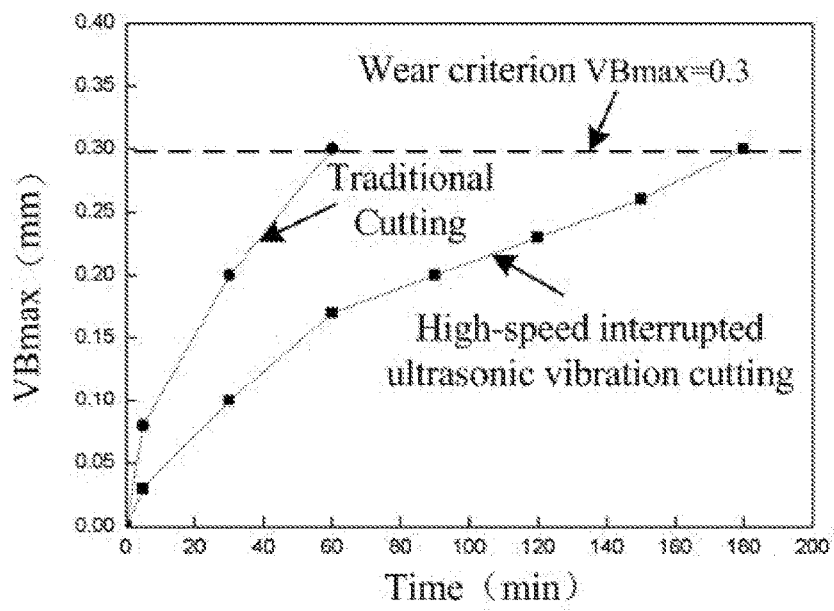
FIG. 5 is a comparison diagram of a tool wear of the high-speed precision interrupted ultrasonic vibration cutting method and the traditional cutting method according to the preferred embodiments of the present invention.
Figure 6:
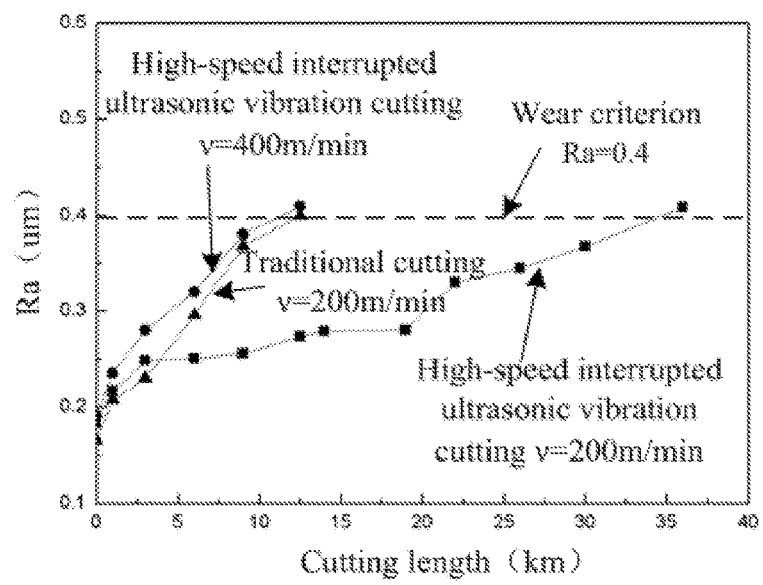
FIG. 6 is a comparison diagram of a surface roughness Ra of the high-speed precision interrupted ultrasonic vibration cutting method and the traditional cutting method according to the preferred embodiments of the present invention.
Figure 12:
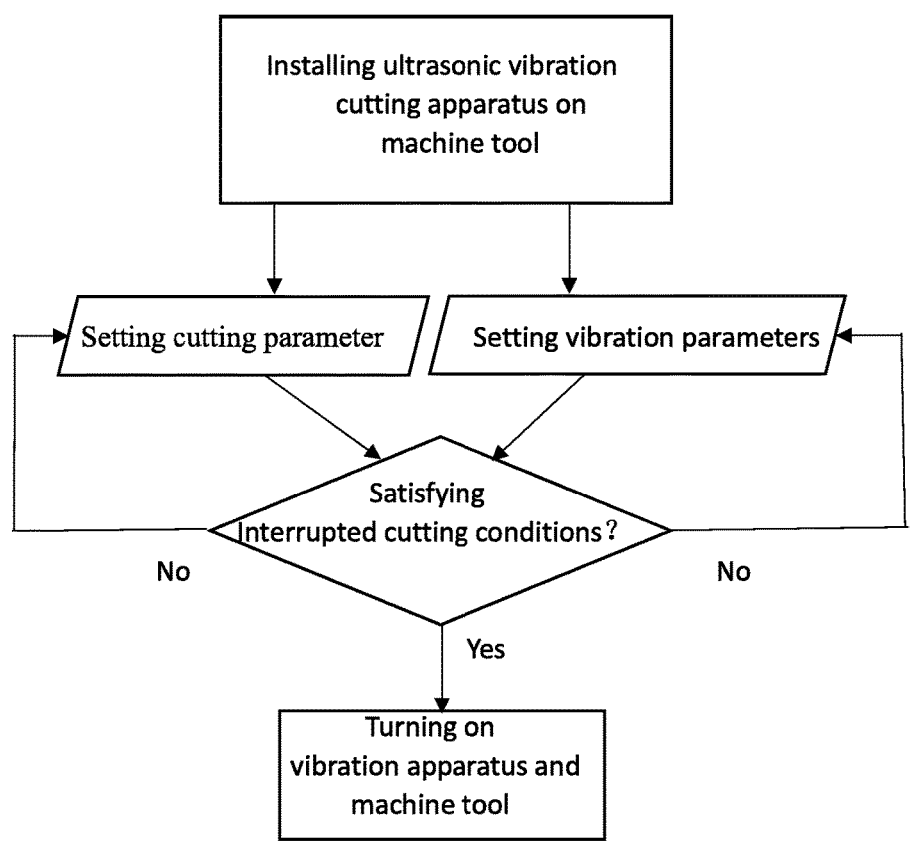
FIG. 12 is a flow chart of the high-speed precision interrupted ultrasonic vibration cutting method according to the preferred embodiments of the present invention.

According to preferred embodiments of the present invention, a high-speed precision interrupted ultrasonic vibration cutting method is provided, wherein a principal diagram thereof is showed in FIG. 3 and FIG. 3A, and a cutting surface profile thereof is showed in FIG. 3B. Different from a conventional ultrasonic vibration cutting method showed in FIG. 2A and an elliptical ultrasonic vibration cutting method showed in FIG. 2B, the present invention has several advantages which are respectively showed in FIG. 4, FIG. 5, and FIG. 6, and enables a cutting speed to exceed a high speed range of a traditional cutting method showed in FIG. 1. A flow chart of the cutting method of the present invention is showed in FIG. 12.

First preferred embodiment: High-speed interrupted ultrasonic vibration turning

Figure 7:
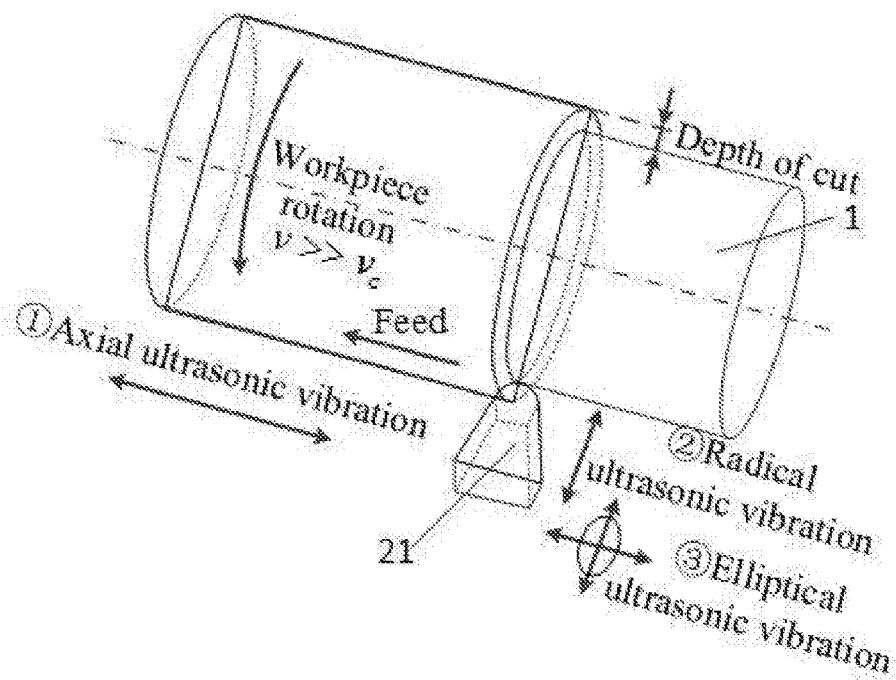
FIG. 7 is a schematic diagram of high-speed interrupted ultrasonic vibration turning according to a first preferred embodiment of the present invention.

Turning is a cutting process, which is for narrowing an outer diameter or an end surface of a circular profile. An application range of turning is generally from semi-roughing roughing machining to finishing machining. A cutting tool of turning is a turning tool 21, referring to FIG. 7.

A workpiece 1 is firstly fixed in a lathe spindle (not shown in figures). Then, turning parameters, such as a spindle rotatory speed (or a workpiece linear speed), a depth of cut and a feedrate, are set. Next, vibration parameters of the turning tool 21, such as a vibration frequency, a vibration direction and a vibration amplitude, are set. The mentioned turning parameters and vibration parameters are required to match each other to satisfy an interrupted separation condition. When a vibration is an axial ultrasonic vibration ①, the vibration direction is vertical to a cutting speed direction and in parallel with a feed direction of the turning tool 21. When the vibration is a radical ultrasonic vibration ②, the vibration direction is vertical to the cutting speed direction and points to a center line of the workpiece 1. When the vibration is an elliptical ultrasonic vibration ③, the vibration direction is a combination of axial and radical directions, and a vibration plane of the vibration is vertical to the cutting speed direction. Finally, an ultrasonic vibration apparatus and the lathe spindle are turned on, and high-speed interrupted ultrasonic vibration turning is carried out.

In an experiment of turning titanium alloys with a linear cutting speed of 200 m/min, a depth of cut of 0.05 mm, a feedrate of 0.005 mm/r and a regular cutting fluid, a maximum reduction of a cutting force is able to reach 50%, a cutting temperature is reduced, a tool life increases by three times, and, a cutting efficiency and a finished surface quality are improved significantly.

Second preferred embodiment: High-speed interrupted ultrasonic vibration milling/grinding Milling is a process, which is for shape machining by rotatory multi-blade tools. An application range of milling is generally from roughing machining to finishing machining. A cutting tool of milling is a milling tool 22.

Grinding is a process, which is for removing of a workpiece by sintered hard abrasive tools or free hard abrasive tools. An application range of grinding is generally from finishing machining to superfinishing machining. A cutting tool of grinding is a grinding tool 23.

Figure 8A:
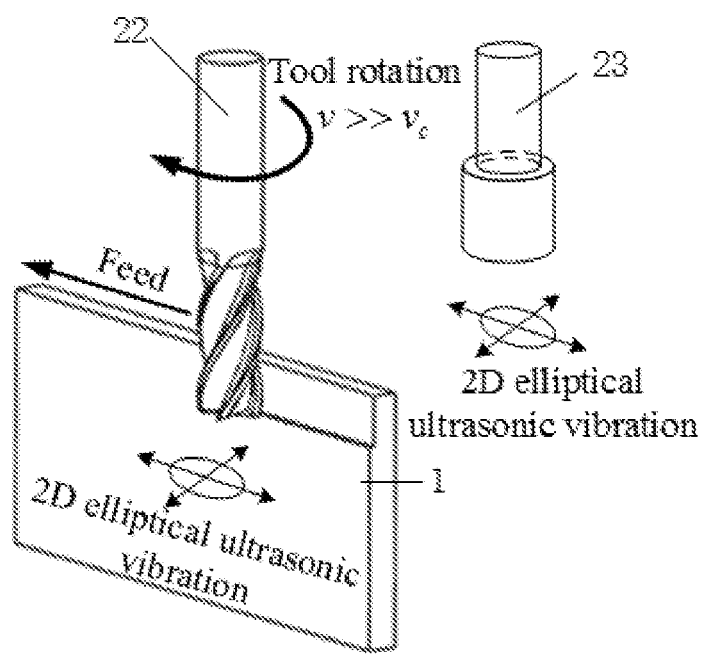
FIG. 8A is a schematic diagram of high-speed interrupted two-dimensional (2D) elliptical ultrasonic vibration milling (grinding) according to a second preferred embodiment of the present invention.
Figure 8B:
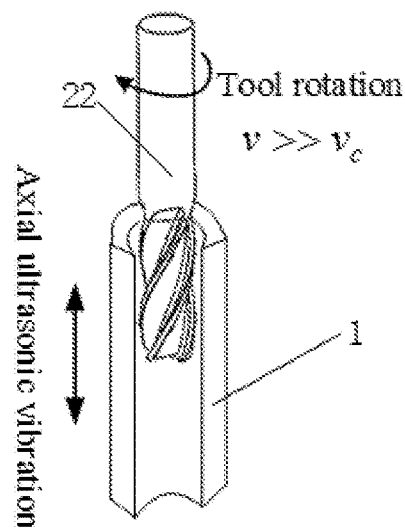
FIG. 8B is a schematic diagram of high-speed interrupted axial ultrasonic vibration plunge milling according to the second preferred embodiment of the present invention.
Figure 8C:
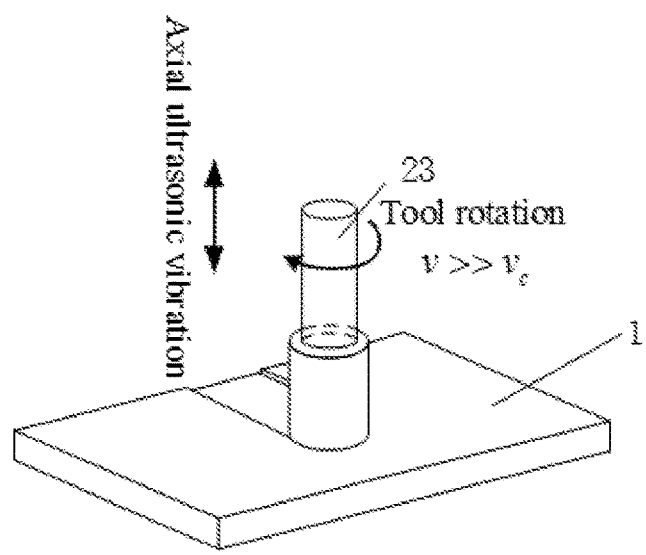
FIG. 8C is a schematic diagram of high-speed interrupted axial ultrasonic vibration grinding according to the second preferred embodiment of the present invention.

A workpiece 1 is firstly fixed in a milling/grinding machine (not shown in figures). Then, milling/grinding parameters, such as a spindle rotatory speed (or a workpiece linear speed), a depth of cut and a feedrate, are set. Next, vibration parameters of the milling tool 22 or the grinding tool 23, such as a vibration frequency, a vibration direction and a vibration amplitude, are set. The mentioned milling/grinding parameters and vibration parameters are required to match each other to satisfy an interrupted separation condition in a cutting process of each milling tooth or each grinding grain. Referring to FIG. 8A, when machining a side surface of the workpiece by a side blade of the milling tool 22 or the grinding tool 23, a vibration is a two-dimensional (2D) elliptical vibration, which has a direction component vertical to a cutting speed direction of each milling tooth or grinding grain. Referring to FIG. 8B, when machining a round corner by the milling tool 22 which is embodied to be a plunge milling tool herein, the vibration is an axial ultrasonic vibration, and the vibration direction is vertical to a cutting speed direction of each cutting blade of the plunge milling tool. Referring to FIG. 8C, when machining an end surface of the workpiece, the vibration is the axial ultrasonic vibration, and the vibration direction is vertical to the cutting speed direction of each grinding grain. Finally, an ultrasonic vibration apparatus and the milling/grinding machine are turned on, and high-speed interrupted ultrasonic vibration milling/grinding is carried out.

In an experiment of milling titanium alloys with a linear cutting speed of 250 m/min, a radical depth of cut of 0.1 mm, an axial depth of cut of 2 mm, a feedrate of 0.005 mm/r and a regular cutting fluid, a maximum reduction of a cutting force is able to reach 60%, a cutting temperature is reduced, a tool life increases by 3.5 times, and, a cutting efficiency and a finished surface quality are improved significantly.

Figure 9:
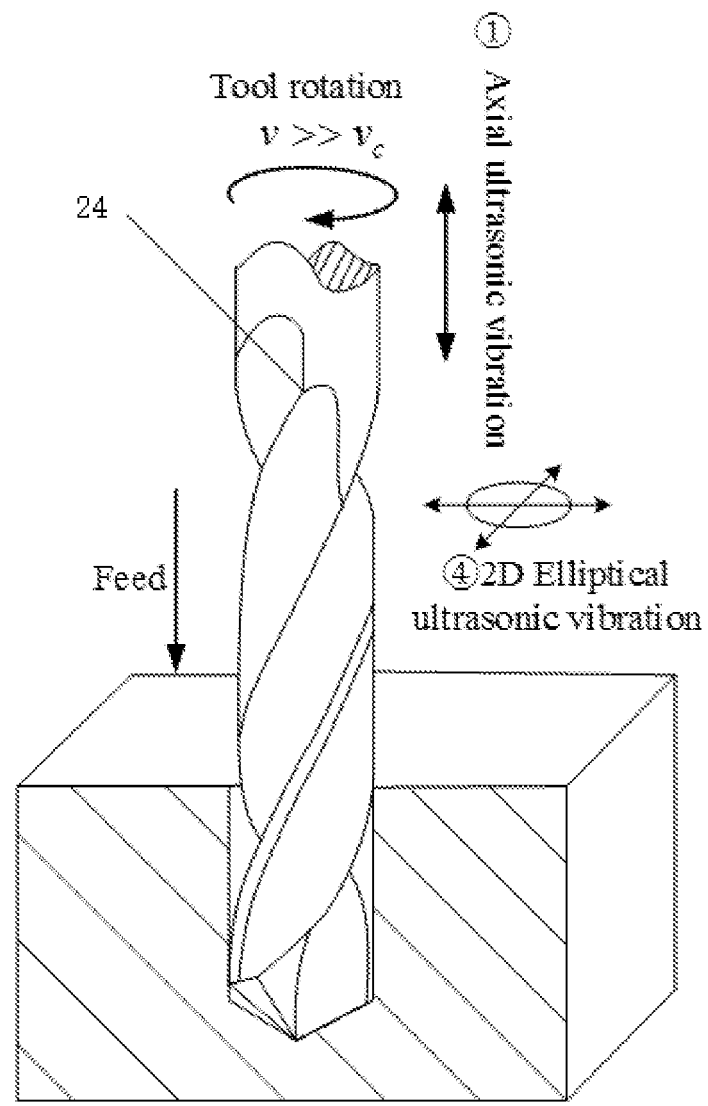
FIG. 9 is a schematic diagram of high-speed interrupted ultrasonic vibration drilling according to a third preferred embodiment of the present invention.

(3) Third preferred embodiment: High-speed interrupted ultrasonic vibration drilling/reaming/counter boring Drilling is a process, which is for hole machining. An application range of drilling is generally from roughing machining to finishing machining. A cutting tool of drilling is a drilling tool 24, referring to FIG. 9.

Figure 10:
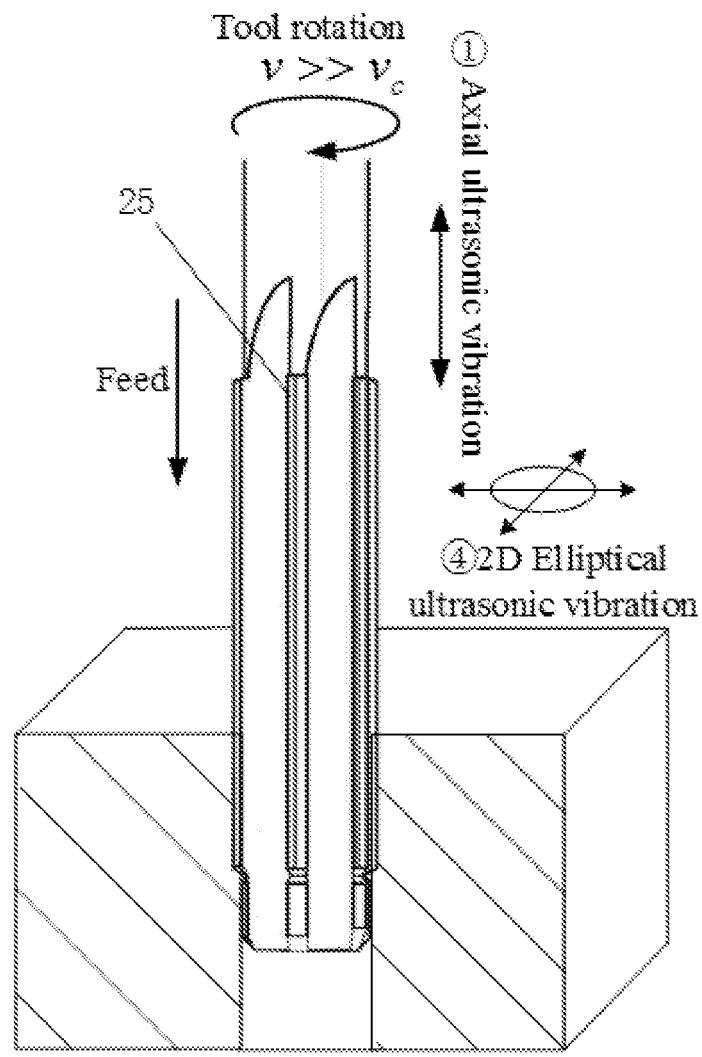
FIG. 10 is a schematic diagram of high-speed interrupted ultrasonic vibration reaming according to the third preferred embodiment of the present invention.

Reaming is a process, which is for removing a thin lamella metal from a finished hole wall in order to obtain an accurate hole diameter and geometric shape with a relatively lower surface roughness. An application range of reaming is generally finishing machining. A cutting tool of reaming is a reamer 25, referring to FIG. 10.

Figure 11:
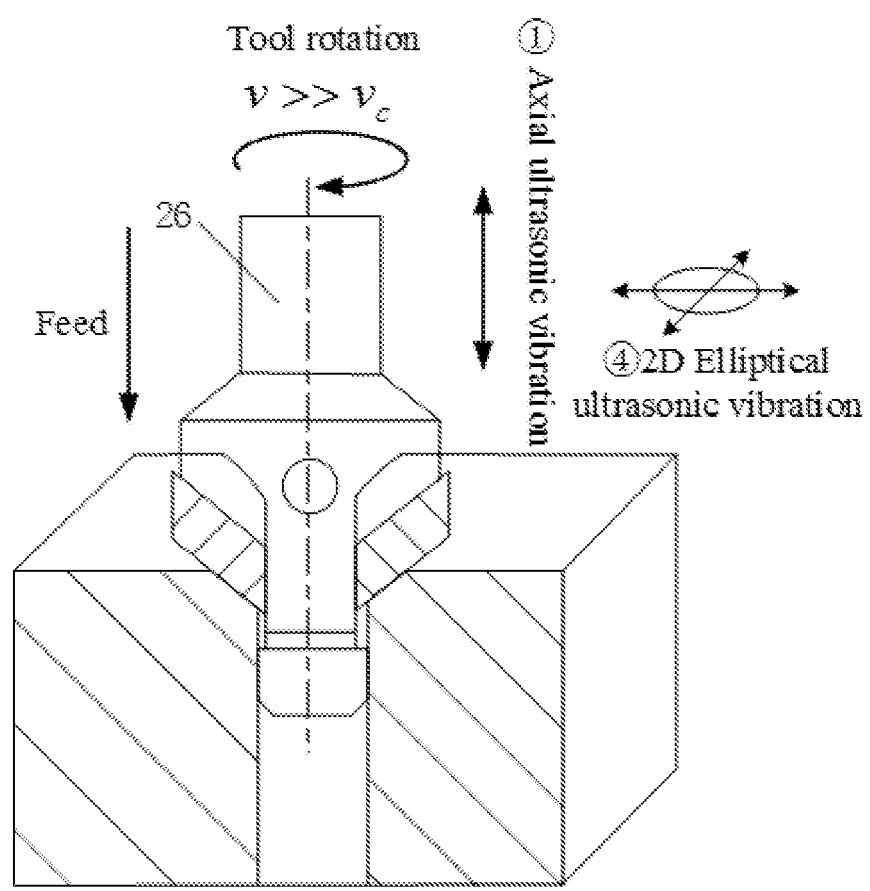
FIG. 11 is a schematic diagram of high-speed interrupted ultrasonic vibration counter boring according to the third preferred embodiment of the present invention.

Counter boring is a process, which is for machining a cylindrical countersunk hole, a conical countersunk hole and a raised head face on finished holes. An application range of counter boring is generally finishing machining. A cutting tool of counter boring is a countersink 26, referring to FIG. 11.

A workpiece 1 is firstly fixed in a drilling machine (not shown in figures). Then, drilling/reaming/counter boring parameters, such as a spindle rotatory speed (or a workpiece linear speed) and a feedrate, are set. Next, vibration parameters of the drilling tool 24, the reamer 25, or the countersink 26, such as a vibration frequency, a vibration direction and a vibration amplitude, are set. The mentioned drilling/reaming/counter boring parameters and vibration parameters are required to match each other to satisfy an interrupted separation condition. When a vibration is an axial ultrasonic vibration ①, the vibration direction is vertical to a cutting speed direction and in parallel with a feed direction of the drilling tool 24, the reamer 25, or the countersink 26. When the vibration is a 2D elliptical ultrasonic vibration ③, the vibration direction is a combination of axial and radical directions, and the vibration has a direction component vertical to the cutting speed direction of the drilling tool 24, the reamer 25, or the countersink 26. Finally, an ultrasonic vibration apparatus and the drilling machine are turned on, and high-speed interrupted ultrasonic vibration drilling/reaming/counter boring is carried out.

The present invention provides the high-speed precision interrupted ultrasonic vibration cutting method, wherein a transverse vibration or a vibration with a transverse component of the tool is applied and varieties of machining process are combined, such as turning, milling, drilling, and grinding. The present invention realizes high-speed precision interrupted ultrasonic vibration cutting for the workpiece. The cutting speed is significantly enhanced by an application of the transverse vibration or the vibration with the transverse component. The cutting speed is enhanced significantly, and exceeds a critical cutting speed of the conventional ultrasonic vibration cutting method and the elliptical ultrasonic vibration cutting method and even the high speed range of the traditional cutting method. Besides, beneficial effects of cutting force and cutting temperature reductions, tool life prolonging, machining cost save, and surface quality and machining accuracy improvements are all obtained at the same time. In order to satisfy the interrupted separation condition of the present invention, cutting parameters and the vibration parameters are required to satisfy a following formula of:

$$\begin{cases} \Delta \leq 2A \\ 2\arcsin(\Delta/2A) \leq \phi \leq 2\pi - 2\arcsin(\Delta/2A) \end{cases}.$$

A periodical separation effect of the cutting tool 2 and the workpiece 1 enables a maximum reduction of a thrust cutting force of 50%, a more obvious temperature reduction because of fully cooling and lubricating the cutting tool in a noncutting stage when a cutting fluid is applied, tool wear deferring, tool life prolonging (by about three times), and significant improvements of the cutting efficiency and the finished surface quality.

What is claimed is:

1. A high-speed precision interrupted ultrasonic vibration cutting method, comprising steps of:
   (1) installing an ultrasonic vibration apparatus on a machine tool, and stimulating a cutting tool to generate a transverse vibration or a vibration with a transverse component, wherein: through combining different vibration types and machining process types, varieties of machining processes are able to be realized;
   (2) realizing an interrupt cutting processing by setting cutting parameters and vibration parameters to satisfy interrupted cutting conditions and periodically separating the cutting tool from a finished surface profile of a workpiece; and
   (3) turning on the ultrasonic vibration apparatus and the machine tool, and starting a high-speed precision interrupted ultrasonic vibration cutting process; wherein:
   high-speed interrupted ultrasonic vibration cutting is able to be realized through the above steps during machining of difficult-to-machine materials in aviation and aerospace fields; a cutting speed is enhanced significantly, which exceeds a critical cutting speed of a conventional ultrasonic vibration cutting method and an elliptical ultrasonic vibration cutting method and even a high speed range of a traditional cutting method; besides, beneficial effects of cutting force and cutting temperature reductions, tool life prolonging, machining cost save, and surface quality and machining accuracy improvements are all obtained at the same time;
   the interrupted cutting condition in the step (2) refers to a formula as listed of:

$$\begin{cases} \Delta \leq 2A \\ 2\arcsin(\Delta/2A) \leq \phi \leq 2\pi - 2\arcsin(\Delta/2A) \end{cases},$$

wherein: $\Delta$ is a center line offset value of two adjacent feed tool paths, which is related to the cutting parameters of feedrate and depth of cut, and determined according to a specific machining process and vibration types; $\phi$ is a phase difference of the two adjacent feed tool paths, which is related to the vibration parameters of tool vibration frequency and workpiece or tool rotatory speed, and determined according to the specific machining process and the vibration types; and A is a tool vibration amplitude.

2. The high-speed precision interrupted ultrasonic vibration cutting method, as recited in claim 1, wherein the ultrasonic vibration apparatus in the step (1) is an apparatus which is able to stimulate the cutting tool to generate a transverse steady ultrasonic vibration or a steady ultrasonic vibration with a transverse component by amplifying a vibration generated by a transducer stimulated by an ultrasonic generator through an horn.

3. The high-speed precision interrupted ultrasonic vibration cutting method, as recited in claim 1, wherein the machine tool in the step (1) is one of lathes, milling machines, drilling machines, grinding machines and machine centers; and the cutting tool in the step (1) is one of turning tools, milling tools, grinding tools, drilling tools, reamers and countersinks.

4. The high-speed precision interrupted ultrasonic vibration cutting method, as recited in claim 1, wherein the transverse vibration or the vibration with the transverse component in the step (1) is an ultrasonic vibration on any point of the cutting tool, and a vibration direction thereof is vertical to a cutting speed direction.

5. The high-speed precision interrupted ultrasonic vibration cutting method, as recited in claim 1, wherein the cutting parameters in the step (2) comprise the depth of cut, the feedrate and the cutting speed; and the vibration parameters in the step (2) comprise a vibration amplitude and a vibration frequency.

6. The high-speed precision interrupted ultrasonic vibration cutting method, as recited in claim 1, wherein the step of "setting cutting parameters and vibration parameters" in the step (2) has principles that: a relative small $\Delta$ and a 180 degree phase difference are optimal for an interrupted separation of best effection; $\Delta$ is a parameter to scale a transverse relation of two adjacent feed tool paths while $\phi$ is a parameter to scale a longitudinal relation of the two adjacent feed tool paths, and, $\Delta$ and $\phi$ affect an interrupted separation effect simultaneously; when a value of $\Delta$ exceeds double of a value of a vibration amplitude, due to an oversized transverse distance between the two adjacent feed tool paths, whatever a value of $\phi$, no interrupted separation effect occurs during the whole cutting process; conversely, when the value of $\phi$ is given in an appropriate neighborhood of zero, because no cross point exists at the two adjacent feed tool paths, whatever the value of $\Delta$, no interrupted separation effect occurs during the whole cutting process.

7. The high-speed precision interrupted ultrasonic vibration cutting method, as recited in claim 1, wherein the finished surface profile in the step (2) is a combination curve of six arcs, respectively an arc $M_1M_2$, an arc $M_2M_3$, an arc $M_3M_4$, an arc $M_4M_5$, an arc $M_5M_6$ and an arc $M_6M_7$, which are respectively an $(N-1)^{th}$ tool motion path, an $(N-2)^{th}$ tool motion path, an $(N-3)^{th}$ tool motion path, an $(N-4)^{th}$ tool motion path, an $(N-5)^{th}$ tool motion path, and an $(N-6)^{th}$ tool motion path; the number of the tool motion paths influencing the finished surface profile is determined by the tool vibration amplitude A and the center line offset value $\Delta$ of two adjacent feed tool paths; when a value of $2A/\Delta$ is an integer, the number equals to $2A/\Delta$, while when the value of $2A/\Delta$ is a decimal, the number equals to an integer part of $2A/\Delta$ plus one; as a tool nose round radius is far greater than a value of Δ, a regular surface profile is obtained after repeatedly cutting by a tool tip and thus a better surface quality is obtained.

8. The high-speed precision interrupted ultrasonic vibration cutting method, as recited in claim 1, wherein the interrupted cutting process in the step (2) is an interrupted cutting process of the cutting tool with the transverse vibration or the vibration with the transverse component along an $N^{th}$ tool motion path which has an interrupted separation effect on the finished surface profile of the workpiece; a point "a" is where the cutting tool is just engaged into the finished surface profile of the workpiece during a vibration cutting cycle; a point "b" is located at a lowest point of the $N^{th}$ tool motion path; a stage from the point "a" to the point "b" is a cut-in stage, during which the tool and the workpiece are in contact sufficiently, a depth of cut increases, a cutting force is enhanced and a cutting heat is accumulated; a point "c" is where the cutting tool is just disengaged form the finished surface profile of the workpiece during a vibration cycle; a stage from the point "b" to the point "c" is a cut-out stage, during which a contact area of the tool and the workpiece decreases, a cutting zone gradually separates from the workpiece, the cutting force decreases and a cutting heat accumulation slows down; at the point "c", the cutting tool is completely separated from the finished surface profile of the workpiece, the cutting zone vanishes, the cutting force decreases to zero, and the cutting heat starts to transmit to surrounding mediums; a point "d" is where the cutting tool is just engaged into the finished surface profile in a next vibration cycle; a stage from the point "c" to the point "d" is a noncutting stage, during which the cutting tool is completely separated from the workpiece, the cutting force stays at zero, if a cooling medium exists, the cutting zone of the cutting tool fully contacts the cooling medium, and a temperature of the cutting tool decreases significantly; and, a process of (point "a")-to-(point "b")-to-(point "c")-to-(point "d") is a cutting process during one vibration cycle when the transverse vibration or the vibration with the transverse component is applied, which occurs periodically as the vibration is repeated periodically during the whole machining process.

\* \* \* \* \*